(12) United States Patent
Fujiwara

(10) Patent No.: US 9,034,996 B2
(45) Date of Patent: May 19, 2015

(54) METHOD FOR MANUFACTURING ACRYLIC ACID-BASED POLYMER AND USE FOR SAME

(71) Applicant: TOAGOSEI CO., LTD., Tokyo (JP)

(72) Inventor: Masahiro Fujiwara, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 14/349,805

(22) PCT Filed: Oct. 29, 2012

(86) PCT No.: PCT/JP2012/077881
§ 371 (c)(1),
(2) Date: Apr. 4, 2014

(87) PCT Pub. No.: WO2013/065634
PCT Pub. Date: May 10, 2013

(65) Prior Publication Data
US 2014/0256872 A1   Sep. 11, 2014

(30) Foreign Application Priority Data

Oct. 31, 2011 (JP) .................................. 2011-238114

(51) Int. Cl.
*C08F 2/00* (2006.01)
*C08F 2/10* (2006.01)
(Continued)

(52) U.S. Cl.
CPC ............... *C08F 120/06* (2013.01); *C08F 20/06* (2013.01); *C08F 2/01* (2013.01); *C08F 220/06* (2013.01); *C11D 3/3757* (2013.01); *C08K 11/00* (2013.01);
(Continued)

(58) Field of Classification Search
USPC ................. 526/65, 317.1, 932, 933; 524/556; 252/180; 210/701
See application file for complete search history.

(56) References Cited

U.S. PATENT DOCUMENTS 4,555,557 A * 11/1985 Fukumoto et al. ............ 526/240
4,681,686 A    7/1987 Richardson et al.
(Continued)

FOREIGN PATENT DOCUMENTS

CN      1676534 A    10/2005
JP      60-174793     9/1985
(Continued)

OTHER PUBLICATIONS

International Search Report issued Nov. 20, 2012 in PCT/ JP2012/077881.
(Continued)

*Primary Examiner* — Fred M Teskin
(74) *Attorney, Agent, or Firm* — Oblon, McClelland, Maier & Neustadt, L.L.P.

(57) ABSTRACT

The present invention relates to a production method for efficiently obtaining an acrylic acid-based polymer having a narrow molecular mass distribution and a low molecular mass, without using a large amount of chain transfer agent. A method for continuously producing an acrylic acid-based polymer obtained by continuously polymerizing a monomer having acrylic acid as an essential component, characterized in that a liquid feed pump applies a mechanical load of 0.5 to 2.5 kJ/L to the liquid discharged from the outlet of a reactor. An acrylic acid-based polymer having fewer high-molecular-mass components, excellent dispersion and other properties, and a low molecular mass is thereby obtained.

12 Claims, 1 Drawing Sheet

(51) Int. Cl.
  *C08F 2/38* (2006.01)
  *C08F 20/06* (2006.01)
  *C08F 120/06* (2006.01)
  *C08F 2/01* (2006.01)
  *C11D 3/37* (2006.01)
  *C08K 11/00* (2006.01)
  *C08F 220/06* (2006.01)

(52) U.S. Cl.
  CPC ........... *Y10S 526/932* (2013.01); *Y10S 526/933* (2013.01)

(56) References Cited

U.S. PATENT DOCUMENTS 5,268,437 A * 12/1993 Holy et al. .................. 526/229
6,335,404 B1    1/2002 Kirk et al.

FOREIGN PATENT DOCUMENTS

| JP | 5- 86125 | 4/1993 |
| JP | 2003-2909 | 1/2003 |
| JP | 2003-40912 | 2/2003 |
| JP | 2003-64108 | 3/2003 |
| JP | 2006-265561 | 10/2006 |
| JP | 2007-217654 | 8/2007 |
| JP | 2008-214374 | 9/2008 |
| JP | 2010-77340 | 4/2010 |

OTHER PUBLICATIONS

Office Action issued Jan. 14, 2015, in Chinese Patent Application No. 201280045963.2 filed Oct. 29, 2012 (w/ English translation).

* cited by examiner

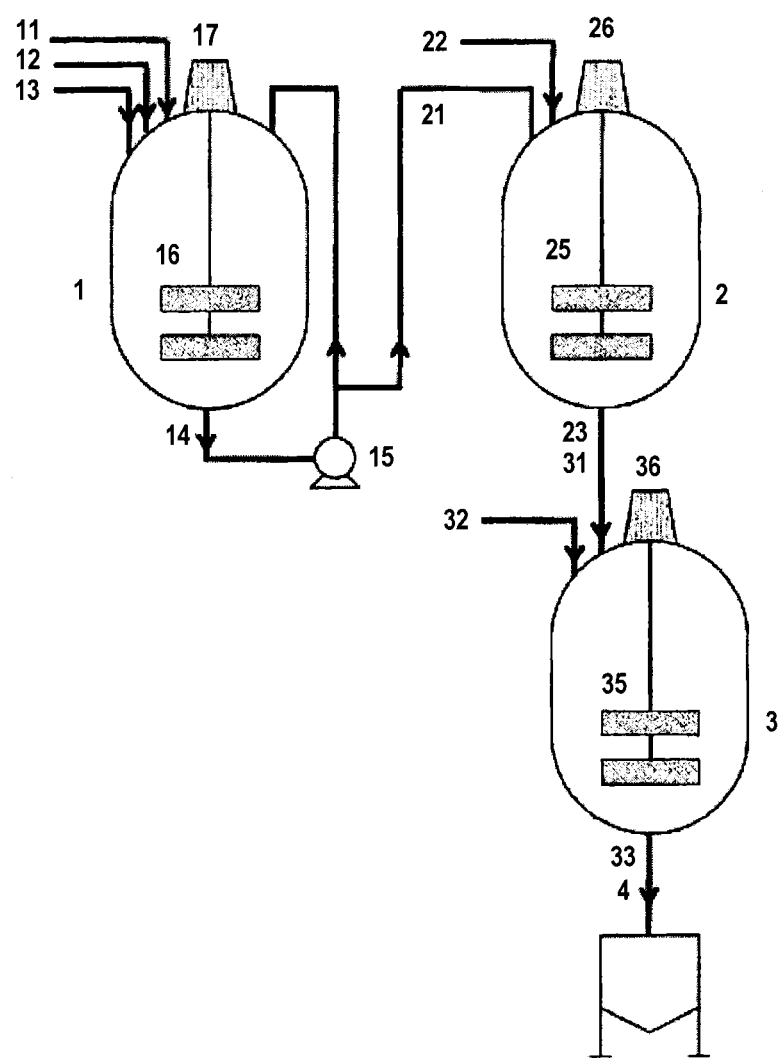

US 9,034,996 B2

METHOD FOR MANUFACTURING ACRYLIC ACID-BASED POLYMER AND USE FOR SAME

FIELD OF THE INVENTION

The present invention relates to a production method of an acrylic acid-based polymer and use for the same. More specifically, the invention relates to an acrylic acid-based polymer useful as a dispersant, a detergent, or an inorganic precipitation inhibitor, and a continuous production method thereof.

BACKGROUND ART

An acrylic acid-based polymer such as sodium polyacrylate is an industrially important compound which is used for wide applications including a pigment dispersant, a builder for detergent, or an inorganic precipitation inhibitor. For these applications, an acrylic acid-based polymer having a low molecular weight like a weight average molecular weight of about 1,000 to 30,000 is preferred, and the molecular weight distribution, which is expressed as a ratio (Mw/Mn) obtained by dividing a weight average molecular weight (Mw) by a number average molecular weight (Mn), that is, variation, is preferably as narrow as possible.

Further, in terms of production thereof, a method with good efficiency such as shortened reaction time or improved productivity is obviously preferred. For a suitable method, development of a continuous production method is also under progress in addition to a production method of a related art which is based on a batch mode.

Under the circumstances, several methods have been suggested with regard to a production method of an acrylic acid-based polymer having a low molecular weight.

Patent Document 1 discloses a novel cotelomer compound useful for inhibition of precipitation of scales from corrosion of a metal and/or an aqueous system and/or promotion of dispersion of particles in an aqueous system, and a production method therefor.

Additionally, the applicant suggests a production method of an acrylic acid-based polymer having a low molecular weight and a narrow molecular weight distribution using a continuous reaction device consisting of plural reactors in which at least one reactor is a tank type reactor in Patent Documents 2 and 3.

Patent Documents 4 and 5 describe that an acrylic acid-based polymer having a low molecular weight and also a narrow molecular weight distribution can be effectively obtained by stirring a reaction liquid with power consumption for stirring (Pv) of 0.5 kW/m$^3$ or higher.

Further, Patent Document 6 discloses a continuous production method for obtaining with high efficiency a water soluble copolymer having a narrow molecular weight distribution in which a reaction device having a tank and a circulation line consisting of pipes which circulate the outside of the tank is used.

PRIOR TECHNICAL DOCUMENT

Patent Document

[Patent Document 1] JP-A S60-174793
[Patent Document 2] JP-A 2003-2909
[Patent Document 3] JP-A 2003-40912
[Patent Document 4] JP-A 2003-64108
[Patent Document 5] JP-A 2008-214374
[Patent Document 6] JP-A 2007-217654

SUMMARY OF THE INVENTION

Problems that the Invention is to Solve

However, it is necessary to use a large amount of a chain transfer agent such as sodium hypophosphite to obtain a polymer having a low molecular weight when the method described in Patent Document 1 is applied. Accordingly, there has been a problem in that, when it is used as a pigment dispersant, for example, the viscosity of the pigment dispersion increases over time.

According to the methods described in Patent Documents 2 and 3, an acrylic acid-based polymer having a relatively narrow molecular weight distribution is obtained. However, because a small amount of a high molecular weight component, which is not suitable for use as a dispersant, is included in the polymer, a dispersion containing it may have high viscosity. Therefore a further improvement in dispersion performance has been desired.

According to the methods described in Patent Documents 4 to 6, an acrylic acid-based polymer having a relatively narrow molecular weight distribution is obtained by suppressing localization of monomers fed to a reactor, or the like. However, similar to those described above, a small amount of a high molecular weight component may be included, and therefore a further improvement in dispersion performance is needed.

An objective of the present invention is to provide a production method for efficiently obtaining an acrylic acid-based polymer having a narrow molecular weight distribution and a low molecular weight, which can exhibit very excellent performance when used in an application including a pigment dispersant, a detergent, or an inorganic precipitation inhibitor, without using a large amount of a chain transfer agent.

Means for Solving the Problems

The present inventors conducted intensive studies in view of the problems described above. As a result, it was found that, for a method for continuous production of an acrylic acid-based polymer wherein a monomer including acrylic acid as an essential component is subjected to continuous polymerization, when a mechanical load of 0.5 to 2.5 kJ/L is applied to a reaction liquid discharged from an outlet of a reactor via a liquid feed pump, an acrylic acid-based polymer having a reduced amount of a high molecular weight component, a narrow molecular weight distribution, an excellent dispersibility, and a low molecular weight can be obtained, and the present invention was completed accordingly.

The present invention is as follows.
1. A continuous production method of an acrylic acid-based polymer in which a monomer including acrylic acid as an essential component is subjected to continuous polymerization, characterized in that a mechanical load of 0.5 to 2.5 kJ/L is applied, via a liquid feed pump, to a reaction liquid discharged from an outlet of a reactor.
2. The production method of an acrylic acid-based polymer according to 1 above, wherein the liquid feed pump is a positive displacement type rotary pump.
3. The production method of an acrylic acid-based polymer according to 1 or 2 above, wherein one reactor or at least two continuous tank type reactors that are installed in series is used.

4. The production method of an acrylic acid-based polymer according to any one of 1 to 3 above, wherein an average circulation number calculated from the following equation is in a range from 1 to 10, (Average circulation number)=(Average retention time in first reactor)×(Flow amount circulating to first reactor via the liquid feed pump)/(Liquid amount in first reactor).

5. An acrylic acid-based polymer obtained by the production method according to any one of 1 to 4 above.
6. The acrylic acid-based polymer according to 5 above, wherein a weight average molecular weight is in a range from 1,500 to 30,000.
7. The acrylic acid-based polymer according to 5 or 6 above, wherein a ratio of a polymer having a molecular weight of 100,000 or higher is 0.1% or less by mass in entire polymers.
8. A dispersant comprising the acrylic acid-based polymer according to any one of 5 to 7 above.
9. A pigment dispersion in which a pigment is dispersed by using the dispersant according to 8 above.
10. A detergent comprising the acrylic acid-based polymer according to any one of 5 to 7 above.
11. An inorganic precipitation inhibitor comprising the acrylic acid-based polymer according to any one of 5 to 7 above.

Effect of the Invention

According to the production method of an acrylic acid-based polymer of the present invention, an acrylic acid-based polymer having a low molecular weight and a narrow molecular weight distribution can be efficiently produced without using a large amount of a chain transfer agent. Further, the acrylic acid-based polymer obtained by the method exhibits excellent performance in an application including a dispersant, a detergent, or an inorganic precipitation inhibitor.

BRIEF DESCRIPTION OF THE DRAWINGS

The FIGURE is a schematic diagram illustrating a continuous reaction apparatus consisting of three tank type reactors as used for an embodiment of the present invention.

EMBODIMENTS FOR CARRYING OUT THE INVENTION

The present invention relates to a continuous production method of an acrylic acid-based polymer having acrylic acid as an essential component, and to a production method of a low molecular weight acrylic acid-based polymer having a narrow molecular weight distribution, and an excellent dispersibility or the like, which is characterized in that a mechanical load of 0.5 to 2.5 kJ/L is applied, via a liquid feed pump, to a reaction liquid discharged from an outlet of a reactor.

Hereinafter, the present invention is described in detail. In the description of the present invention, "(meth)acryl" means acryl and/or methacryl.

In the continuous production method of an acrylic acid-based polymer according to the present invention, one reactor or at least two reactors that are installed in series are used. Shape and type of the reactor are not particularly limited and a reactor known in the field such as a tank type reactor and a tubular reactor can be used. From the viewpoint of having little localization of raw materials including a monomer added to a reactor, a tank type reactor is preferable.

As described herein, the reactor used for a case in which only one reactor is used and the first reactor for a case in which at least two reactors that are installed in series are used are referred to as a "first reactor." Further, the reactor subsequently installed in downstream of the first reactor is referred to as a "second reactor". The same shall be applied herein below. Number of the reactor is suitably determined in consideration of production capability, site for installation, cost, or the like.

As the tank type reactor, excluding being capable of extracting liquid of reaction product, a reactor commonly used for batch mode polymerization can be used. It is also preferable to have a stirrer and a device for temperature control. The device for temperature control may be a device known in the field such as jacket, internal coil, and external heat exchanger.

In the present invention, a mechanical load of 0.5 to 2.5 kJ/L is applied, via a liquid feed pump, to a reaction liquid discharged from an outlet of a reactor. The mechanical load indicates "mechanical load per unit volume" that is calculated from (shaft power/discharge amount) of the liquid feed pump.

In general, the acrylic acid-based polymer obtained by a polymerization reaction contains a small amount of a high molecular weight component that is not desirable for the use of a dispersant or the like. In order to suppress generation of such high molecular weight component, use of a chain transfer agent is effective. However, when a large amount of a chain transfer agent is used, performance such as dispersibility is negatively affected, and therefore the usage amount is limited. Since a suitable mechanical load is applied to an acrylic acid-based polymer in the present invention, a polymer chain having high molecular weight is cleaved. As a result, the resulting acrylic acid-based polymer has low content of a high molecular weight component, and thus it becomes possible to use it preferably for various applications including a dispersant.

As described above, it is necessary to apply, via a liquid feed pump, a mechanical load of 0.5 to 2.5 kJ/L to liquid discharged from a reactor. The mechanical load is preferably in a range from 0.7 to 2.0 kJ/L, and particularly from 0.9 to 1.8 kJ/L. If the mechanical load is lower than 0.5 kJ/L, the effect of cleaving the high molecular weight component is insufficient so that there is a case in which performances such as dispersibility are poor. On the other hand, when the mechanical load is higher than 2.5 kJ/L, the mechanical load is too high so that the polymer chain is excessively cleaved, and thus it is difficult to obtain a target product having appropriate molecular weight.

The liquid feed pump is not particularly limited as long as it can apply the mechanical load described above. It is possible to use a non-positive displacement type turbo pump, a positive displacement type pump, and other special pumps. From the viewpoint of having easy application of a suitable load and stability for feeding liquid, a positive displacement type pump is preferable. Examples of the positive displacement type pump include a reciprocating pump such as a piston pump, a plunger pump and a diaphragm pump; a rotary pump such as a gear pump, a vane pump and a screw pump; and the like. Among them, a rotary pump is preferable from the viewpoint of having easy application of a suitable load.

When the positive displacement type pump described above is used as a liquid feed pump, a revolution number may be selected depending on volume and mode of a pump. The revolution number is preferably in a range from 100 to 450 rpm, more preferably from 130 to 400 rpm, and particularly from 160 to 350 rpm. If the revolution number is lower than 100 rpm, the effect of cleaving the high molecular weight component is insufficient so that there is a case in which performances such as dispersibility are poor. On the other hand, if the revolution number is higher than 450 rpm, the mechanical load is too high so that the polymer chain is excessively cleaved, and thus it is difficult to obtain a target product having appropriate molecular weight.

In the present invention, the liquid discharged from the first reactor is transferred via the liquid feed pump to the next step, for example, to the second reactor or a product storage tank. However, as a circulating liquid, it is also possible to return a part of the discharged liquid to the first reactor. For such a case, an average circulation number calculated from the following equation is preferably in a range from 1 to 10, and more preferably from 1.5 to 6.

(Average circulation number)=(Average retention time in first reactor)×(Flow amount circulating to first reactor via liquid feed pump)/(Liquid amount in first reactor)

As it is clear from the above equation, the average circulation number corresponds to an average number of receiving a mechanical load via the liquid feed pump by a reaction liquid while the reaction liquid retains in the first reactor. When the average circulation number is lower than 1, the effect of cleaving the high molecular weight component is insufficient so that there is a case in which performances such as dispersibility are poor. On the other hand, when the average circulation number is higher than 10, the polymer chain is excessively cleaved, and thus it is difficult to obtain a target product having appropriate molecular weight.

It is sufficient that the liquid feed pump is installed at one spot or two or more spots from the first reactor to a process for filling or storing a final product, such as a storage tank. From the viewpoint of having effective application of a mechanical load with circulation of a reaction liquid in the first reactor, it is preferably installed at an outlet of the first reactor.

It is sufficient that the monomer for the acrylic acid-based polymer is a monomer including at least acrylic acid. Thus, the entire amount of the monomer may be consisting of acrylic acid, or acrylic acid may be contained in only a part of the monomer.

A monomer other than acrylic acid (hereinafter, referred to as "other monomer") is not particularly limited so long as it is a monomer copolymerizable with acrylic acid. Specific example thereof is a radical polymerizable vinyl-based monomer (polymerizable unsaturated compound). Examples of the vinyl-based monomer include an ethylenically unsaturated carboxylic acid other than acrylic acid, a neutralized salt of an ethylenically unsaturated carboxylic acid, a (meth) acrylic acid alkyl ester compound, an aromatic vinyl compound, an acid anhydride, a vinyl compound having an amino group, a vinyl compound having an amide group, a vinyl group having a sulfonic acid group, a vinyl group having a polyoxyalkylene group, a vinyl compound having an alkoxy group, a vinyl compound having a cyano group, a cyanidated vinyl compound, a vinyl ether compound, a vinyl ester compound, a conjugated diene, and the like. These compounds may be used singly or in combination of two or more types thereof.

Among them, from the viewpoint of physical properties such as dispersion stability and suppressed coloration of a resulting dispersant, a (meth)acrylic acid alkyl ester compound and a vinyl compound having a polyoxyalkylene group are preferable.

Examples of the ethylenically unsaturated carboxylic acid other than acrylic acid include methacrylic acid, ethacrylic acid, maleic acid, fumaric acid, itaconic acid, crotonic acid, a product of half-esterification of phthalic acid anhydride with an alkyl alcohol, a product of half-esterification of itaconic acid anhydride with an alkyl alcohol, and the like.

Examples of the neutralized salt of an ethylenically unsaturated carboxylic acid include a salt of ethylenically unsaturated carboxylic acid in which a carboxyl group in acrylic acid, methacrylic acid, ethacrylic acid, maleic acid, fumaric acid, itaconic acid, or crotonic acid is neutralized. Further, examples of the salt of ethylenically unsaturated carboxylic acid include an alkali metal salt, an alkali earth metal salt, an ammonium salt, an organic amine salt, and the like.

Examples of the (meth)acrylic acid alkyl ester compound include methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, tert-butyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth) acrylate, n-decyl (meth)acrylate, n-dodecyl (meth)acrylate, n-octadecyl (meth)acrylate, isobornyl (meth)acrylate, cyclohexyl (meth)acrylate, phenyl (meth)acrylate, benzyl (meth) acrylate, and the like.

Examples of the aromatic vinyl compound include styrene, 2-methyl styrene, 3-methyl styrene, 4-methyl styrene, α-methyl styrene, 2,4-dimethyl styrene, 2,4-diisopropyl styrene, 4-tert-butyl styrene, tert-butoxy styrene, vinyl toluene, vinyl naphtharene, halogenized styrene, styrene sulfonic acid, α-methyl styrene sulfonic acid, and the like.

Examples of the acid anhydride monomer include maleic acid anhydride, itaconic acid anhydride, citraconic acid anhydride, and the like.

Examples of the vinyl compound having an amino group include dimethylaminomethyl (meth)acrylate, diethylaminomethyl (meth)acrylate, 2-dimethylaminoethyl (meth)acrylate, 2-diethylaminoethyl (meth)acrylate, 2-(di-n-propylamino)ethyl (meth)acrylate, 2-dimethylaminopropyl (meth) acrylate, 2-diethylaminopropyl (meth)acrylate, 2-(di-n-propylamino)propyl (meth)acrylate, 3-dimethylaminopropyl (meth)acrylate, 3-diethylaminopropyl (meth)acrylate, 3-(di-n-propylamino)propyl (meth)acrylate, and the like.

Examples of the vinyl compound having an amide group include (meth)acrylamide, N,N-dimethyl (meth)acrylamide, N,N-dimethylaminopropyl (meth)acrylamide, N-methylol (meth)acrylamide, and the like.

Examples of the vinyl compound having a sulfonic acid group include methallyl sulfonic acid, acrylamide-2-methyl-2-propane sulfonic acid, and the like.

Examples of the vinyl compound having a polyoxyalkylene group include (meth)acrylic acid ester of an alcohol having a polyoxyethylene group and/or a polyoxypropylene group, and the like.

Examples of the vinyl group having an alkoxy group include 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth)acrylate, 2-(n-propoxy)propyl (meth) acrylate, 2-(n-butoxy)propyl (meth)acrylate, and the like.

Examples of the (meth)acrylic acid ester compound having a cyano group include cyanomethyl (meth)acrylate, 1-cyanoethyl (meth)acrylate, 2-cyanoethyl (meth)acrylate, 1-cyanopropyl (meth)acrylate, 2-cyanopropyl (meth)acrylate, 3-cyanopropyl (meth)acrylate, 4-cyanobutyl (meth)acrylate, 6-cyanohexyl (meth)acrylate, 2-ethyl-6-cyanohexyl (meth) acrylate, 8-cyanooctyl (meth)acrylate, and the like.

Examples of the cyanidated vinyl compound include acrylonitrile, methacrylonitrile, ethacrylonitrile, and the like.

Examples of the vinyl ether compound include vinyl methyl ether, vinyl ethyl ether, vinyl n-butyl ether, vinyl phenyl ether, vinyl cyclohexyl ether, and the like. These compounds may be used singly or in combination of two or more types thereof.

Examples of the vinyl ester monomer include vinyl formate, vinyl acetate, vinyl propionate, and the like.

Examples of the conjugated diene include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene, and the like.

Other examples include a maleimide-based compound such as maleimide, N-methyl maleimide, N-butyl maleimide, N-phenyl maleimide, and N-cyclohexyl maleimide; a maleic acid ester compound; an itaconic acid ester compound; an N-vinyl heterocyclic compound such as vinyl pyridine; and the like.

Among those other monomers, preferred are maleic acid anhydride, acrylamide-2-methyl-2-propanesulfonic acid, and the like. In the case of using those monomers in combination with acrylic acid, excellent adsorption to a pigment and excellent affinity for a solvent are obtained when used for a pigment dispersant, for example, and thus the dispersibility can be improved.

In the polymerization for the acrylic acid-based polymer, when the monomer includes a monomer other than acrylic acid, content of the acrylic acid is preferably 80% or more by mass, more preferably 90% or more by mass, and further preferably 95% or more by mass, relative to 100% by mass of the total amount of the monomer. In the present invention, particularly preferred is to have 100% by mass of acrylic acid for the total amount of the monomer. When the content of the acrylic acid is 80% or more by mass, the resulting dispersant can have sufficient solubility in water.

The method for polymerizing an acrylic acid-based polymer is not particularly limited. An aqueous solution polymerization is preferred. With an aqueous solution polymerization, a dispersant can be obtained as a homogenous solution.

When the aqueous solution polymerization is conducted, water or a mixture of water and an organic solvent can be used as a polymerization solvent. Preferable examples of the organic solvent in the case of using a mixture liquid with water include an alcohol such as isopropyl alcohol, and a ketone such as acetone. Particularly preferred is an isopropyl alcohol.

Further, a publicly known polymerization initiator can be used for the polymerization reaction. In particular, a radical polymerization initiator is preferably used.

Examples of the radical polymerization initiator include a persulfate salt such as sodium persulfate, potassium persulfate, and ammonium persulfate; a hydroperoxide such as t-butyl hydroperoxide; a water soluble peroxide such as hydrogen peroxide; a ketone peroxide such as methyl ethyl ketone peroxide and cyclohexanone peroxide; an oil-soluble peroxide such as dialkyl peroxide including di-t-butyl peroxide and t-butyl cumyl peroxide; an azo compound such as 2,2'-azobis(2-methylpropionamidine) dihydrochloride; and the like.

The above-described peroxide-based radical polymerization initiator may be used singly or in combination of two or more types thereof.

Among the peroxide-based radical polymerization initiators described above, a persulfate salt and an azo compound are preferred from the viewpoint of having easy control of the polymerization reaction. A persulfate salt is particularly preferred.

The radical polymerization initiator is diluted, for example, with an aqueous medium and then fed to a reactor via an inlet that is different from that of the monomer.

A ratio of the radical polymerization initiator to be used is not particularly limited. However, based on the total weight of the entire monomers constituting the acrylic acid-based polymer, the radical polymerization initiator is used at a ratio of preferably 0.1% to 15% by weight, and more preferably 0.5% to 10% by weight. When the ratio is set at 0.1% or higher by weight, (co)polymerization rate can be improved. When the ratio is set at 15% or lower by weight, stability of the resulting polymer is improved, and thus excellent performance is obtained when used as a dispersant or the like.

Further, depending on a specific case, production can be performed using a water soluble redox-based polymerization initiator as the polymerization initiator. The redox-based polymerization initiator may be a combination of an oxidizing agent (for example, peroxide described above), and a reducing agent such as sodium bisulfate, ammonium bisulfate, sodium sulfite, and sodium hydrosulfite, or a combination of the oxidizing agent and iron alum or potassium alum.

In the production of an acrylic acid-based polymer, a chain transfer agent may be suitably added to the polymerization system to control the molecular weight of the polymer. Examples of the chain transfer agent include sodium phosphite, sodium hypophosphite, sodium bisulfite, mercaptoacetic acid, mercaptopropionic acid, 2-propanethiol, 2-mercaptoethanol, thiophenol, isopropyl alcohol, and the like.

The chain transfer may be used singly or in combination of two or more types thereof.

Among the chain transfer agents described above, sodium hypophosphite, sodium bisulfite, and isopropyl alcohol are preferred from the viewpoint of having easy control of molecular weight. Sodium hypophosphite is particularly preferred.

The chain transfer agent may be added to a reactor via an inlet, which is different from an inlet for the monomer or the polymerization initiator. It can be also mixed with the monomer immediately before supplying to the reactor. The usage amount thereof is in a range from 0.3% to 50% by mol, and more preferably from 1.0% to 25% by mol relative to the amount (mole number) of the monomer.

A polymerization temperature for the polymerization reaction in first reactor is not particularly limited. The temperature is preferably in a range from 60° C. to 100° C.

When the polymerization temperature is 60° C. or higher, the polymerization reaction becomes faster and thus excellent productivity is obtained. Further, when the temperature is 100° C. or lower, coloration of the product can be suppressed.

Further, although the reaction can be performed under increased pressure or reduced pressure, as cost will occur in relation to the facilities required for a reaction under increased pressure or reduced pressure, the reaction is preferably performed under atmospheric pressure.

The monomer is preferably supplied as an aqueous solution containing it to a reactor. Concentration of the monomer in the aqueous solution is preferably in a range from 30% to 60% by mass. With regard to the monomer supply speed, from the viewpoint of a balance between production efficiency and quality of the resulting polymer, the supply rate allowing about 1 to 4 hours retention of the monomer in the first reactor is preferable.

Further, in the case where two or more reactors installed in series are used in the present invention, it is preferable to perform 90% or more of the polymerization reaction in the first reactor, from the viewpoint of obtaining a polymer having a narrow molecular weight distribution. To do so, it is preferable that most of the monomers to be used are supplied to the first reactor. Specifically, it is preferable that 90% or more of the monomers to be used be supplied to the first reactor, and more preferably that 95% or more of the monomers to be used be supplied to the first reactor. If not all of the monomers are supplied to the first reactor, the remaining monomers are obviously supplied to the second or following reactor. The reaction temperature of the second or following reactor is preferably in a range from 20° C. to 100° C., and more preferably from 30° C. to 90° C.

For the purpose of adjusting pH of a reaction liquid during the polymerization reaction or a solution of an acrylic acid-based polymer obtained as a final product, an alkali agent (neutralizing agent) is used. Specific examples thereof include an alkali metal hydroxide such as sodium hydroxide and potassium hydroxide; an alkali earth metal hydroxide such as calcium hydroxide and magnesium hydroxide; ammonia; an organic amine such as monoethanolamine, diethanolamine, and triethanolamine; and the like. The alkali agent may be used singly or in combination of two or more types thereof.

The weight average molecular weight (Mw) of the acrylic acid-based polymer of the present invention is preferably in a range from 1,500 to 30,000, and more preferably from 2,500 to 20,000. If the weight average molecular weight is lower than 1,500, the dispersion stability may become insufficient when the acrylic acid-based polymer is used as a dispersant or the like. If the weight average molecular weight is higher than 30,000, a ratio of a polymer having a molecular weight of 100,000 or higher, which is inappropriate for dispersion, is increased so that a poor dispersibility may be yielded. The weight average molecular weight can be measured by gel permeation chromatography (GPC) using a standard material such as sodium polyacrylate.

In the acrylic acid-based polymer, a ratio of the polymer having a molecular weight of 100,000 or higher is preferably 0.1% or less by mass in the entire polymers. In the present invention, when a mechanical load of 0.5 to 2.5 kJ/L is applied, via a liquid feed pump, to a liquid discharged from the outlet of a reactor according to the method described above, the ratio of the polymer having a molecular weight of 100,000 or higher can be reduced to 0.1% or less by mass. In this regard, it is estimated that a polymer chain having a high molecular weight is cleaved when the aforementioned mechanical load is applied to an aqueous solution containing the acrylic acid-based polymer.

As described above, the acrylic acid-based polymer used in applications including a dispersant for an inorganic pigment, a builder for a detergent, and an inorganic precipitation inhibitor is preferably an acrylic acid-based polymer having a low molecular weight such as weight average molecular weight ranging from 1,000 to 30,000, and it is preferable that the molecular weight distribution is as narrow as possible.

On the other hand, a polymer having a high molecular weight of 100,000 or higher not only increases a viscosity of a system but also may crosslink the particles in dispersoid due to adsorption onto a surface of plural dispersoids, and therefore it is an inappropriate component for dispersion. Thus, it is preferable to contain the high molecular weight component as little as possible.

The high molecular weight component can be also reduced by using a chain transfer agent. In such a case, it is necessary to use a large amount of a chain transfer agent, and it eventually yields a deteriorated dispersibility and increased cost. However, the method of applying a suitable mechanical load via a liquid feed pump to cleave the polymer chain of a high molecular weight component in the present invention does not require a large amount of a chain transfer agent, and therefore it is a useful method.

The acrylic acid-based polymer of the present invention has a low content of a polymer component having a high molecular weight such as molecular weight of 100,000 or higher, and therefore it can exhibit excellent performance in applications including a dispersant for a pigment, a detergent, an inorganic precipitation inhibitor, and the like. The dispersant for a pigment can be used as a dispersant for obtaining an aqueous dispersion liquid for various pigments, and is particularly useful as a dispersant for obtaining a dispersion of inorganic pigment consisting of calcium carbonate or the like.

EXAMPLES

Hereinafter, the present invention is specifically described using Examples. In the following, "part(s)" means part(s) by mass, and "%" means % by mass.

Solid content of a polymer or the like obtained in each example was measured according to the following method.

<Solid Content>

About 1 g of an applicable measurement sample was weighed (a), followed by measurement (b) of a residue after drying the sample at a temperature of 155° C. for 30 minutes by an air blow dryer, thereby calculating a solid concentration of the sample by the following equation. Used for the measurement was a weighing bottle. The other manipulations were conducted according to JIS K 0067-1992 (Test methods for loss and residue of chemical products).

$$\text{Solid content}(\%) = (b/a) \times 100$$

Example 1

As illustrated in the FIGURE, three tank type reactors each equipped with a stirrer were prepared and arranged in series in the order of a first reactor, a second reactor, and a third reactor so that a flow from a raw material composition to a reaction product has this order. In each reactor, 2,000 L of an aqueous solution containing polyacrylic acid having a weight average molecular weight of 6,000 and having a solid content of 40% was added in advance, and the liquid temperature was maintained at a temperature of 80° C. under stirring.

To the first reactor, 60% aqueous solution of acrylic acid, 15% aqueous solution of sodium persulfate, and 30% aqueous solution of sodium hypophosphite were added at a rate of 20 kg/min, 1.2 kg/min, and 3.0 kg/min, respectively. For transporting liquid from the first reactor to the second reactor, a positive displacement type rotary pump was used. The discharge amount by the pump was 56 L/min (=61.6 kg/min calculated using specific gravity of reaction liquid of 1.1), shaft power was 1.3 kW, mechanical load was 1.4 kJ/L, and the revolution number of gear-wheel was 240 rpm. Further, a circulation line branched from the liquid feed pipe to the second reactor for returning to the first reactor was installed on the first reactor.

With regard to the discharge liquid, only 24.2 kg/min was supplied to the second reactor while the remaining liquid of 37.4 kg/min was supplied from the liquid feed pump to the first reactor via the circulation line so that the liquid amount in the first reactor is maintained at 2,000 L. According to the calculation based on the aforementioned requirement, the average retention time in the first reactor was 91 minutes and the average circulation number was 1.5.

In the second reactor, the polymerization reaction was continued while the same temperature as the first reactor is maintained. Further, by feeding 24.2 kg/min, which is the same as the liquid amount supplied to the second reactor, to a third reactor, the liquid amount in the reactor was maintained at 2,000 L.

After that, 48% aqueous solution of sodium hydroxide and water were supplied to the third reactor to adjust pH of the reaction liquid of 7 to 8 and a solid content of 40%. Discharge of the reaction liquid to the outside of the system was performed while maintaining the liquid amount of 2,000 L in the reactor.

Meanwhile, the reaction liquid in the second reactor and the reaction liquid in the third reactor were discharged by its own weight without using a liquid feed pump.

This operation was continued for 20 hours, and the liquid discharged from the third reactor was collected to obtain an aqueous solution E1 of acrylic acid-based polymer having a solid content of 40% and pH 7.5.

The weight average molecular weight (Mw) of E1 was measured by gel permeation chromatography (GPC). As for the condition for GPC measurement, HLC8020 system (manufactured by TOSOH CORPORATION) was used, detection was performed by RI detector, and G4000 PW×1, G3000 PW×1, and G2500 PW×1 columns were used after connecting them to each other. The elution solution was 0.1 M NaCl+phosphate buffer (pH 7) and the calibration curve was established by using sodium polyacrylate (manufactured by Sowa Kagaku K.K.). As a result of the measurement, Mw of E1 was 6,000 and a content having a molecular weight of 100,000 or higher was 0.004% as obtained by calculation of molecular weight fraction.

<Wet Grinding Test with Ground Calcium Carbonate>

A cylindrical container was charged with 7 g of E1, 340 g of ion exchange water, and 1,000 g of ground calcium carbonate "No. A Heavy Carbonate" (trade name) manufactured by Maruo Calcium Co., Ltd. They were stirred lightly for homogeneous mixing. After that, 2,700 g of media (1 mm$\phi$ ceramic beads) was added to the cylindrical container and then wet grinding was carried out by stirring at 1,000 rpm for 50 minutes. The liquid was passed through a 150 mesh filter cloth, and the slurry was collected. Ion exchanged water was added to this slurry so that a solid content of the resulting slurry was adjusted to 75%. A viscosity of the slurry on that day of the wet grinding and a viscosity of the slurry after being allowed to stand at 25° C. for 7 days were measured using type B viscometer under conditions of 25° C. and 60 rpm. The viscosity of the slurry on the grinding day was 160 mPa·s, and the viscosity after keeping for seven days was 1,400 mPa·s. Further, an integrated value under 1.32 µm of the slurry immediately after the production was measured using a laser diffraction scattering particle size distribution analyzer "LA-910" manufactured by HORIBA Ltd. As a result, the value of 90% was obtained.

<Dispersion Test With Precipitated Calcium Carbonate>

A cylindrical container was charged with 10 g of E1, 230 g of ion exchange water, and 770 g of precipitated calcium carbonate. After that, stirring was carried out at 4,000 rpm for 10 minutes to prepare a dispersion slurry. A viscosity of the slurry immediately after dispersion and a viscosity of the slurry after being allowed to stand at 25° C. for 7 days were measured using type B viscometer under conditions of 25° C. and 60 rpm. The viscosity of the slurry immediately after dispersion was 300 mPa·s, and the viscosity after keeping for seven days was 1,200 mPa·s.

<Dispersing of Silt-1>

1.5 g of E1 was added to 200 g of silt-filled water that contains alluvial clay collected from an municipal area of Osaka, and has specific gravity of 1.16, viscosity of 940 mPa·s, and adjusted pH of 7.0 and stirred for 5 minutes. The viscosity immediately after stirring was measured by using type B viscometer under conditions of 25° C. and 60 rpm. As a result, it was found to be 30 mPa·s.

<Dispersing of Silt-2>

1 g of clay "Amazon 88 Non Predisperse" (trade name) Mitsubishi Corporation, 100 g of ion exchange water, and 13 mg of E1 were added to a 100 mL mess cylinder and stirred for 10 minutes with a magnetic stirrer. After keeping it for 18 hours at a temperature of 25° C., the supernatant liquid was collected and absorbance at a wavelength of 380 nm was measured. The absorbance of the supernatant liquid in which E1 is used was 1.2.

<Test for Calcium Ion Supplementing Activity>

E1 was added to 100 mL of a 200 mgCa/L calcium chloride solution and 1 mL of 4 M potassium chloride solution to have E1 in an amount of 200 mg-solid and sodium hydroxide was used to adjust to pH 5. After keeping it at a temperature of 30° C. for 10 minutes, a concentration of calcium ion remaining in the solution was measured by a calcium ion meter "D-53" (manufactured by HORIBA, Ltd.) having a calcium ion electrode "6583-10C", and a supplemented calcium ion was calculated. The amount of calcium ion captured by E1 was 420 mgCaCO$_3$/g.

<Calcium Carbonate Scale Inhibition Test>

E1 was added to 100 mL of a 50 mgCa/L calcium chloride solution to have E1 in an amount of 200 mg-solid and sodium hydroxide was used to adjust to pH 8.5. 10 g of 3% sodium hydrogen carbonate solution was added and then it was kept at a temperature of 70° C. for 3 hours. Precipitates were separated by filtration, a calcium concentration in the filtrate was obtained by EDTA titration, and a scale inhibition ratio was calculated. The calcium carbonate scale inhibition ratio of E1 was 75%.

<Detergency Test>

20% of dodecyl benzene sulfonic acid, 10% of sodium silicate, 10% of anhydrous sodium carbonate, 40% of anhydrous sodium sulfate, and 20% of E1 were used to prepare a detergent composition. 1 g of the detergent composition and 1 L of tap water from city of Nagoya were contained to a stirring type washing test device, and then five pieces of artificially soiled cloth (10 cm×10 cm, prepared by Cleaning Science Association) were added thereto. Subsequently these soiled cloths were washed at a temperature of 25° C. for 5 minutes, and rinsing was performed for 5 minutes. After that the washed cloths were dried, reflectance on a surface of the cloth was measured by using a surface reflection tester. A detergency ratio was calculated using the following equation, and it was found to be 55%.

Detergency ratio(%)=$(R_W-R_S)/(R_0-R_S)\times100$

In the equation, $R_W$: Surface reflectance of artificially soiled cloth after washing $R_S$: Surface reflectance of artificially soiled cloth $R_0$: Surface reflectance of white cloth before soiling Examples 2 to 8

Aqueous solutions E2 to E8 of acrylic acid-based polymer were produced in the same manner as those in Example 1 except that the operation conditions including a raw material feed amount and conditions for pump feed liquid were modified to those described in Table 1. Physical properties and evaluation results of each polymer obtained are also described in Table 1.

Examples 9 to 16

Aqueous solutions E9 to E16 of acrylic acid-based polymer were produced in the same manner as those in Example 1 except that the operation conditions including a raw material feed amount and conditions for pump feed liquid were modified to those described in Table 2. Physical properties and evaluation results of each polymer obtained are also described in Table 2.

Examples 17 to 19

Aqueous solutions E17 to E19 of acrylic acid-based polymer were produced in the same manner as those in Example 1 except that the operation conditions including a raw material feed amount and conditions for liquid pump feed liquid were modified to those described in Table 3. Physical properties and evaluation results of each polymer obtained are also described in Table 3.

Comparative Examples 1 and 2

Aqueous solutions C1 and C2 of acrylic acid-based polymer were produced in the same manner as those in Example 1 except that the operation conditions including a raw material feed amount and conditions for liquid pump feed liquid were modified to those described in Table 4. Physical properties and evaluation results of each polymer obtained are also described in Table 4.

TABLE 1

| | | | Example | | | | | | | |
|---|---|---|---|---|---|---|---|---|---|---|
| | | | 1 | 2 | 3 | 4 | 5 | 6 | 7 | 8 |
| | Acrylic acid-based polymer | | E1 | E2 | E3 | E4 | E5 | E6 | E7 | E8 |
| First reactor | 60% AA | (kg/minute) | 20 | 40 | 20 | 20 | 20 | 40 | 20 | 40 |
| | 15% NPS | (kg/minute) | 1.2 | 2.4 | 1.2 | 1.2 | 1.2 | 2.4 | 1.2 | 2.4 |
| | 30% NHP | (kg/minute) | 3.0 | 6.0 | 3.0 | 3.0 | 3.0 | 6.0 | 3.0 | 6.0 |
| | Liquid amount | (L) | 2000 | 4000 | 3000 | 3000 | 2000 | 4000 | 2000 | 4000 |
| | Temperature | (° C.) | 80 | 80 | 80 | 80 | 80 | 80 | 80 | 80 |
| | Discharge amount | (L/minute) | 56 | 240 | 72 | 135 | 65 | 200 | 90 | 170 |
| | Shaft power | (kW) | 1.3 | 4.5 | 2.0 | 2.2 | 0.9 | 6.5 | 0.9 | 6.9 |
| | Mechanical load per unit volume | (kJ/L) | 1.4 | 1.1 | 1.7 | 1.0 | 0.8 | 2.0 | 0.6 | 2.4 |
| | Gear-wheel revolution number | (rpm) | 240 | 250 | 190 | 330 | 300 | 200 | 320 | 170 |
| | Circulation amount of reaction solution | (kg/minute) | 37 | 216 | 55 | 124 | 47 | 172 | 75 | 139 |
| | Average retention time | (minute) | 91 | 91 | 136 | 136 | 91 | 91 | 91 | 91 |
| | Average circulation number | | 1.5 | 4.5 | 2.3 | 5.1 | 2.0 | 3.5 | 3.1 | 2.9 |
| Product | Solid content | (%) | 40 | 40 | 40 | 40 | 40 | 40 | 40 | 40 |
| | PH | | 7.5 | 7.5 | 7.5 | 7.5 | 7.5 | 7.5 | 7.5 | 7.5 |
| | Mw | | 6000 | 6000 | 5900 | 5900 | 6000 | 5600 | 6100 | 5200 |
| | Mw/Mn | | 1.9 | 1.8 | 1.8 | 1.9 | 2.0 | 2.0 | 2.1 | 2.1 |
| | Content of molecular weight of 100000 or higher | (%) | 0.004 | 0.004 | 0.003 | 0.003 | 0.008 | 0.001 | 0.02 | 0.001 |
| Wet grinding test with ground calcium carbonate | Under 1.32 μm | (%) | 90 | 90 | 90 | 90 | 90 | 90 | 90 | 90 |
| | Slurry viscosity on grinding day | (mPa·s) | 160 | 150 | 140 | 150 | 170 | 160 | 170 | 160 |
| | Slurry viscosity after 7 days | (mPa·s) | 1400 | 1300 | 1200 | 1300 | 1500 | 1600 | 1700 | 1800 |
| Dispersion test with precipitated calcium carbonate | Slurry viscosity immediately after dispersing | (mPa·s) | 300 | 290 | 290 | 290 | 310 | 300 | 310 | 300 |
| | Slurry viscosity after 7 days | (mPa·s) | 1200 | 1100 | 1000 | 1100 | 1300 | 1400 | 1500 | 1600 |
| Silt dispersion-1 | Viscosity immediately after stirring | (mPa·s) | 30 | 28 | 28 | 29 | 31 | 32 | 33 | 33 |
| Silt dispersion-2 | Absorbance of supernatant liquid | | 1.2 | 1.3 | 1.3 | 1.2 | 1.0 | 1.1 | 1.0 | 1.1 |
| Ca capturing activity | Captured calcium ion | (mgCaCO3/g) | 420 | 430 | 430 | 420 | 410 | 410 | 400 | 410 |
| Scale inhibition test | Calcium carbonate scale inhibition ratio | (%) | 75 | 76 | 76 | 76 | 74 | 74 | 73 | 73 |
| Detergency test | Detergency ratio | (%) | 55 | 56 | 57 | 56 | 54 | 53 | 53 | 52 |

TABLE 2

| | | | Example | | | | | | | |
|---|---|---|---|---|---|---|---|---|---|---|
| | | | 9 | 10 | 11 | 12 | 13 | 14 | 15 | 16 |
| | Acrylic acid-based polymer | | E9 | E10 | E11 | E12 | E13 | E14 | E15 | E16 |
| First reactor | 60% AA | (kg/minute) | 20 | 20 | 20 | 20 | 40 | 24 | 40 | 16 |
| | 15% NPS | (kg/minute) | 1.2 | 1.2 | 1.2 | 1.2 | 2.4 | 1.4 | 2.4 | 1 |
| | 30% NHP | (kg/minute) | 3.0 | 3.0 | 3.0 | 3.0 | 6.0 | 3.6 | 6.0 | 2.4 |
| | Liquid amount | (L) | 2000 | 2000 | 2000 | 2000 | 4000 | 2000 | 4000 | 2000 |

TABLE 2-continued

| | | | Example | | | | | | | |
|---|---|---|---|---|---|---|---|---|---|---|
| | | | 9 | 10 | 11 | 12 | 13 | 14 | 15 | 16 |
| | Temperature | (° C.) | 80 | 80 | 80 | 80 | 80 | 80 | 80 | 80 |
| | Discharge amount | (L/minute) | 65 | 90 | 60 | 120 | 95 | 240 | 72 | 240 |
| | Shaft power | (kW) | 1.0 | 1.3 | 0.9 | 1.7 | 2.1 | 4.5 | 2.0 | 4.5 |
| | Mechanical load per unit volume | (kJ/L) | 0.9 | 0.9 | 0.9 | 0.9 | 1.3 | 1.1 | 1.7 | 1.1 |
| | Gear-wheel revolution number | (rpm) | 140 | 380 | 110 | 440 | 250 | 250 | 240 | 250 |
| | Circulation amount of reaction solution | (kg/minute) | 47 | 75 | 42 | 108 | 56 | 235 | 31 | 245 |
| | Average retention time | (minute) | 91 | 91 | 91 | 91 | 91 | 76 | 91 | 113 |
| | Average circulation number | | 2.0 | 3.1 | 1.7 | 4.5 | 1.2 | 8.1 | 0.6 | 12.6 |
| Product | Solid content | (%) | 40 | 40 | 40 | 40 | 40 | 40 | 40 | 40 |
| | PH | | 7.5 | 7.5 | 7.5 | 7.5 | 7.5 | 7.5 | 7.5 | 7.5 |
| | Mw | | 6100 | 5500 | 6100 | 5300 | 6100 | 5200 | 6100 | 4600 |
| | Mw/Mn | | 2.0 | 2.0 | 2.1 | 2.2 | 2.1 | 2.1 | 2.4 | 2.3 |
| | Content of molecular weight of 100000 or higher | (%) | 0.007 | 0.001 | 0.02 | 0.001 | 0.02 | 0.001 | 0.06 | 0.001 |
| Wet grinding test with ground calcium carbonate | Under 1.32 μm | (%) | 90 | 90 | 90 | 90 | 90 | 90 | 90 | 90 |
| | Slurry viscosity on grinding day | (mPa · s) | 170 | 160 | 180 | 160 | 170 | 160 | 220 | 160 |
| | Slurry viscosity after 7 days | (mPa · s) | 1500 | 1600 | 1600 | 1700 | 1600 | 1600 | 2300 | 2300 |
| Dispersion test with precipitated calcium carbonate | Slurry viscosity immediately after dispersing | (mPa · s) | 310 | 310 | 320 | 310 | 320 | 310 | 320 | 340 |
| | Slurry viscosity after 7 days | (mPa · s) | 1400 | 1400 | 1500 | 1600 | 1600 | 1500 | 2100 | 1600 |
| Silt dispersion-1 | Viscosity immediately after stirring | (mPa · s) | 32 | 32 | 32 | 33 | 32 | 34 | 39 | 38 |
| Silt dispersion-2 | Absorbance of supernatant liquid | | 1.1 | 1.1 | 1.0 | 1.1 | 1.0 | 1.1 | 0.8 | 0.9 |
| Ca capturing activity | Captured calcium ion | (mgCaCO3/g) | 410 | 410 | 400 | 400 | 410 | 410 | 370 | 380 |
| Scale inhibition test | Calcium carbonate scale inhibition ratio | (%) | 74 | 73 | 74 | 73 | 73 | 74 | 68 | 69 |
| Detergency test | Detergency ratio | (%) | 53 | 54 | 53 | 52 | 53 | 52 | 49 | 47 |

TABLE 3

| | | | Example | | |
|---|---|---|---|---|---|
| | | | 17 | 18 | 19 |
| Acrylic acid-based polymer | | | E17 | E18 | E19 |
| First reactor | 60% AA | (kg/minute) | 20 | 20 | 20 |
| | 15% NPS | (kg/minute) | 1.2 | 1.2 | 1.2 |
| | 30% NHP | (kg/minute) | 5.0 | 1.5 | 1.2 |
| | Liquid amount | (L) | 4000 | 1500 | 1400 |
| | Temperature | (° C.) | 80 | 80 | 80 |
| | Discharge amount | (L/minute) | 72 | 72 | 72 |
| | Shaft power | (kW) | 2.0 | 2.0 | 2.0 |
| | Mechanical load per unit volume | (kJ/L) | 1.7 | 1.7 | 1.7 |
| | Gear-wheel revolution number | (rpm) | 190 | 240 | 240 |
| | Circulation amount of reaction solution | (kg/minute) | 53 | 57 | 57 |
| | Average retention time | (minute) | 168 | 73 | 69 |
| | Average circulation number | | 2.0 | 2.5 | 2.5 |
| Product | Solid content | (%) | 40 | 40 | 40 |
| | PH | | 7.5 | 7.5 | 7.5 |
| | Mw | | 2300 | 27000 | 40000 |
| | Mw/Mn | | 1.4 | 2.5 | 2.8 |
| | Content of molecular weight of 100000 or higher | (%) | 0.001 | 0.07 | 0.09 |
| Wet grinding test with ground calcium carbonate | Under 1.32 μm | (%) | 90 | 90 | 90 |
| | Slurry viscosity on grinding day | (mPa · s) | 160 | 180 | 240 |
| | Slurry viscosity after 7 days | (mPa · s) | 1800 | 1900 | 2600 |
| Dispersion test with precipitated calcium carbonate | Slurry viscosity immediately after dispersing | (mPa · s) | 300 | 310 | 340 |
| | Slurry viscosity after 7 days | (mPa · s) | 1700 | 1800 | 2300 |
| Silt dispersion-1 | Viscosity immediately after stirring | (mPa · s) | 31 | 35 | 43 |
| Silt dispersion-2 | Absorbance of supernatant liquid | | 1.1 | 1.0 | 0.7 |
| Ca capturing activity | Captured calcium ion | (mgCaCO3/g) | 420 | 390 | 360 |
| Scale inhibition test | Calcium carbonate scale inhibition ratio | (%) | 74 | 72 | 65 |
| Detergency test | Detergency ratio | (%) | 54 | 51 | 45 |

TABLE 4

|  |  |  | Comparative Example 1 | Comparative Example 2 |
|---|---|---|---|---|
| Acrylic acid-based polymer |  |  | C1 | C2 |
| First reactor | 60% AA | (kg/minute) | 20 | 40 |
|  | 15% NPS | (kg/minute) | 1.2 | 2.4 |
|  | 30% NHP | (kg/minute) | 3.0 | 6.0 |
|  | Liquid amount | (L) | 2000 | 4000 |
|  | Temperature | (° C.) | 80 | 80 |
|  | Discharge amount | (L/minute) | 140 | 160 |
|  | Shaft power | (kW) | 0.8 | 7.5 |
|  | Mechanical load per unit volume | (kJ/L) | 0.3 | 2.8 |
|  | Gear-wheel revolution number | (rpm) | 350 | 160 |
|  | Circulation amount of reaction solution | (kg/minute) | 130 | 128 |
|  | Average retention time | (minute) | 91 | 91 |
|  | Average circulation number |  | 5.4 | 2.6 |
| Product | Solid content | (%) | 40 | 40 |
|  | PH |  | 7.5 | 7.5 |
|  | Mw |  | 6400 | 1400 |
|  | Mw/Mn |  | 2.6 | 1.4 |
|  | Content of molecular weight of 100000 or higher | (%) | 0.23 | 0.001 |
| Wet grinding test with ground calcium carbonate | Under 1.32 μm | (%) | 90 | 90 |
|  | Slurry viscosity on grinding day | (mPa · s) | 290 | 160 |
|  | Slurry viscosity after 7 days | (mPa · s) | 3100 | 3400 |
| Dispersion test with precipitated calcium carbonate | Slurry viscosity immediately after dispersing | (mPa · s) | 410 | 370 |
|  | Slurry viscosity after 7 days | (mPa · s) | 3000 | 3100 |
| Silt dispersion-1 | Viscosity immediately after stirring | (mPa · s) | 57 | 58 |
| Silt dispersion-2 | Absorbance of supernatant liquid |  | 0.4 | 0.5 |
| Ca capturing activity | Captured calcium ion | (mgCaCO3/g) | 310 | 320 |
| Scale inhibition test | Calcium carbonate scale inhibition ratio | (%) | 60 | 61 |
| Detergency test | Detergency ratio | (%) | 41 | 40 |

Details of the compounds in Table 1 and Table 2 are described below.

AA: Acrylic acid

NPS: Sodium persulfate

NHP: Sodium hypophosphite

The acrylic acid-based polymer E1 to E19 obtained in Examples 1 to 19 all had a desirable weight average molecular weight (Mw) and a content of a polymer having a molecular weight of 100,000 or higher was sufficiently suppressed. It was also found that the dispersant, detergent, and inorganic precipitation inhibitor containing those acrylic acid-based polymers exhibited a favorable performance. Further, the pigment dispersion obtained by using the dispersant had only a small increase in viscosity according to the test after maintaining it for 7 days, indicating excellent fluidity.

On the other hand, Comparative Example 1 is an example in which the mechanical load applied to a reaction liquid was relatively small, and the effect of cleaving a high molecular weight component was insufficient so that a result of having a high content of a product having a high molecular weight was obtained. In addition, Comparative Example 2 is an example in which the mechanical load was too high, and Mw of the obtained polymer was low due to excessive cleaving.

Further, the acrylic acid-based polymer C1 and C2 obtained from those Comparative Examples did not show a satisfying performance in various evaluations that are related to practical performance.

INDUSTRIAL APPLICABILITY

According to the present invention, an acrylic acid-based polymer having a low molecular weight in which a high molecular weight product having a molecular weight more than a specific value is sufficiently reduced can be obtained efficiently without using a large amount of a chain transfer agent. Further, the acrylic acid-based polymer exhibits a very excellent performance when used for applications including a pigment dispersant, a detergent, and an inorganic precipitation inhibitor.

EXPLANATION OF THE REFERENCE NUMBERS

1: First reactor
11: Polymerization initiator supply pipe
12: Acrylic acid-based monomer supply pipe
13: Chain transfer agent supply pipe
14: Reaction liquid discharge pipe
15: Pump
16: Stirrer
17: Motor for driving stirrer
2: Second reactor
21: Reaction liquid supply pipe
22: Polymerization initiator supply pipe
23: Reaction liquid discharge pipe
25: Stirrer
26: Motor for driving stirrer
3: Third reactor
31: Reaction liquid supply pipe
32: Alkali agent supply pipe
33: Polymer discharge pipe
35: Stirrer
36: Motor for driving stirrer
4: Vessel for filling

What is claimed is:

1. A production method of an acrylic acid-based polymer, comprising subjecting a monomer comprising acrylic acid as an essential component to continuous polymerization, wherein a mechanical load of from 0.5 to 2.5 kJ/L is applied, via a liquid feed pump, to a reaction liquid discharged from an outlet of a reactor.

2. The production method according to claim 1,
wherein the liquid feed pump is a positive displacement type rotary pump.

3. The production method according to claim 1,
wherein the reactor is one reactor or at least two continuous tank type reactors that are installed in series.

4. The production method according to claim 1,
wherein an average circulation number calculated from the following equation is from 1 to 10, (Average circulation number)=(Average retention time in first reactor)×(Flow amount circulating to the first reactor via the liquid feed pump)/(Liquid amount in the first reactor).

5. The production method according to claim 1, wherein a weight average molecular weight of the acrylic acid-based polymer is from 1,500 to 30,000.

6. The production method according to claim 1, wherein a ratio of a polymer having a molecular weight of 100,000 or higher is 0.1% or less by mass in entire polymers of the acrylic acid-based polymer.

7. The production method according to claim 1, wherein the mechanical load of from 0.9 to 1.8 kJ/L is applied.

8. The production method according to claim 4, wherein the average circulation number is from 1.5 to 6.

9. The production method according to claim 1, wherein a content of the acrylic acid in the monomer is 80% or more by mass.

10. The production method according to claim 1, wherein the continuous polymerization is conducted by an aqueous solution polymerization.

11. The production method according to claim 1, wherein the monomer is polymerized with a chain transfer agent, an amount of the chain transfer agent being from 1.0% to 25% by mol based on 100% by mol of an amount of the monomer.

12. The production method according to claim 11, wherein a weight average molecular weight of the acrylic acid-based polymer is from 1,500 to 30,000.

* * * * *